(12) United States Patent
Lotfi et al.

(10) Patent No.: US 9,932,205 B2
(45) Date of Patent: Apr. 3, 2018

(54) ASYMMETRIC AND STEERED SHEAVES FOR TWISTED MULTI-BELT ELEVATOR SYSTEMS

(71) Applicant: OTIS ELEVATOR COMPANY, Farmington, CT (US)

(72) Inventors: Amir Lotfi, Redondo Beach, CA (US); Alan Stover Githens, Greensburg, PA (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 0 days.

(21) Appl. No.: 15/411,202

(22) Filed: Jan. 20, 2017

(65) Prior Publication Data

US 2017/0129743 A1    May 11, 2017

Related U.S. Application Data

(63) Continuation of application No. 14/777,058, filed as application No. PCT/US2013/032155 on Mar. 15, 2013, now Pat. No. 9,643,819.

(51) Int. Cl.
*B66B 15/04* (2006.01)
*B66B 7/06* (2006.01)
(Continued)

(52) U.S. Cl.
CPC ........... *B66B 15/04* (2013.01); *B66B 7/06* (2013.01); *B66B 9/00* (2013.01); *F16H 55/36* (2013.01); *F16H 2055/363* (2013.01)

(58) Field of Classification Search
CPC .. B66B 15/04; B66B 7/06; B66B 9/00; F16H 55/36; F16H 2055/363
See application file for complete search history.

(56) References Cited

U.S. PATENT DOCUMENTS 1,265,110 A * 5/1918 Prentiss ................. B65H 75/14
242/118.6
1,316,972 A * 9/1919 Prentiss ................. B65H 75/22
140/92.2
(Continued)

FOREIGN PATENT DOCUMENTS

CN    1938212 A    3/2007
CN    1997581 A    7/2007
(Continued)

OTHER PUBLICATIONS

European Search Report and Communication; Application No. PCT/US2013032155; dated Nov. 4, 2016; 58 pages.
(Continued)

*Primary Examiner* — Michael A Riegelman
(74) *Attorney, Agent, or Firm* — Cantor Colburn LLP

(57) ABSTRACT

An elevator system includes an elevator car located in a hoistway. One or more belts are operably connected to the elevator car to drive and/or support the elevator car along the hoistway. The one or more belts are routed over one or more sheaves. The one or more sheaves include an outer surface rotatable about a central axis and a flange located at at least one lateral end of the sheave. The sheave further includes a tracking compensator to limit lateral motion of the belt along the outer surface to prevent the belt from contacting the flange.

10 Claims, 7 Drawing Sheets

(51) Int. Cl.
*B66B 9/00* (2006.01)
*F16H 55/36* (2006.01)

(56) References Cited

U.S. PATENT DOCUMENTS

| | | | | |
|---|---|---|---|---|
| 1,361,250 | A * | 12/1920 | Birchard | B21C 47/28 |
| | | | | 242/118.62 |
| 2,966,065 | A * | 12/1960 | Renner | B65G 39/071 |
| | | | | 193/37 |
| 3,288,338 | A * | 11/1966 | Morrow | B65G 39/071 |
| | | | | 226/193 |
| 4,196,864 | A * | 4/1980 | Cole | A01K 89/003 |
| | | | | 242/118.6 |
| 4,589,601 | A * | 5/1986 | Scherer | B65H 75/00 |
| | | | | 242/159 |
| 4,991,784 | A * | 2/1991 | Schmid | B64G 9/00 |
| | | | | 242/390.3 |
| 4,995,855 | A * | 2/1991 | Hasebe | F16H 55/38 |
| | | | | 474/167 |
| 7,699,159 | B2 | 4/2010 | Mori | |
| 7,753,175 | B2 * | 7/2010 | Fanion | B66B 11/0206 |
| | | | | 187/250 |
| 8,157,198 | B2 | 4/2012 | Shiga | G11B 23/044 |
| | | | | 242/332.4 |
| 9,423,002 | B2 * | 8/2016 | Yamaguchi | G03G 15/757 |
| 2004/0129501 | A1 * | 7/2004 | Wittur | B66B 11/008 |
| | | | | 187/254 |
| 2004/0256180 | A1 * | 12/2004 | Eichhorn | B66B 15/04 |
| | | | | 187/254 |
| 2006/0016641 | A1 * | 1/2006 | Koeppe, Jr. | B66B 11/008 |
| | | | | 187/250 |
| 2006/0153607 | A1 * | 7/2006 | Mori | B41J 11/007 |
| | | | | 399/361 |
| 2007/0252121 | A1 * | 11/2007 | Prasad | B66B 15/04 |
| | | | | 254/393 |
| 2009/0194505 | A1 | 8/2009 | Slafer | |
| 2010/0236869 | A1 * | 9/2010 | Fargo | B66B 7/062 |
| | | | | 187/251 |
| 2016/0039639 | A1 | 2/2016 | Lofti et al. | |
| 2016/0304321 | A1 * | 10/2016 | Guilani | B66B 7/06 |
| 2016/0362279 | A1 * | 12/2016 | St. Pierre | B66B 7/08 |

FOREIGN PATENT DOCUMENTS

| | | |
|---|---|---|
| EP | 1832543 A1 | 9/2007 |
| WO | 2006005215 A2 | 1/2006 |

OTHER PUBLICATIONS

Notification of Transmittal of the International Search Report and the Written Authority of the International Searching Authority; PCT/US2013/032155; Korean Intellectual Property Office; dated Dec. 18, 2013; ISR 5 pages; WO 6 pages.

State Intellectual Property Office of People's Republic China Search Report; Application No. 201380076566.6; dated Sep. 27, 2016; 2 pages.

* cited by examiner

ASYMMETRIC AND STEERED SHEAVES FOR TWISTED MULTI-BELT ELEVATOR SYSTEMS

CROSS REFERENCE TO RELATED APPLICATIONS

This continuation application claims priority to International Patent Application No. PCT/US2013/032155 filed on Mar. 15, 2013 and is a continuation of U.S. Non-Provisional Application 14/777,058 filed on Sep. 15, 2015. The content of this application is incorporated herein by reference in its entirety.

BACKGROUND

The subject matter disclosed herein relates to elevator systems driven by belts. More specifically, the subject disclosure relates sheave configurations from elevator systems driven by belts.

Elevator systems utilize one or more belts, such as coated steel belts operably connected to an elevator car, and driven by a motor to propel the elevator car along a hoistway. Coated steel belts in particular include a plurality of wires located at least partially within a jacket material. The plurality of wires is often arranged into one or more strands and the strands are then arranged into one or more cords. In an exemplary belt construction, a plurality of cords is typically arranged equally spaced within a jacket in a longitudinal direction.

The motor drives a sheave, in this case a traction sheave, over which the coated steel belt is routed. The belt gains traction at the traction sheave, such that rotation of the traction sheave consequently drives movement of the elevator car. The system may further include other sheaves around which the coated steel belts are routed to change direction of the coated steel belt. In some systems, the roping arrangement of belts is such that sheaves are used to rotate or twist the belts as required. For example, as shown in FIG. 9, is a single belt 100 system the sheaves 102 may be arranged as shown such that a pure twist of the belt 100 is achieved, with no draw of the belt 100 between sheaves 102. Referring now to FIG. 10, in systems with multiple, parallel belts 100, for example, two belts 100, the sheave 102 arrangement imparts draw, as well as twist between the sheaves 102. The arrangement produces pure twist in one belt 100, while also producing twist and draw in the other belt 100. The draw results in tracking problems for the belt 100, causing the belt to move laterally on a sheave crown 104 and hit flanges 106 of the sheave. This causes excessive wear on the belt 100, especially at edges thereof, and also causes belt-sheave noise and uneven stress on the belt 100 which leads to premature belt 100 failure.

Further, in some systems, one sheave pair 108 is at a fixed location in the hoistway, while the other sheave pair 110 is located at an elevator car. As the elevator car moves in the hoistway, the distance between sheave pairs 108 and 110 changes, so that the draw angle also changes. For example, as the sheave pairs 108 and 110 move closer together, the draw angle increases, Tracking deviation is therefore not constant, and becomes more severe as the sheave pairs 108 and 110 move closer together.

BRIEF DESCRIPTION

In one embodiment, an elevator system includes an elevator car located in a hoistway. One or more belts are operably connected to the elevator car to drive and/or support the elevator car along the hoistway. The one or more belts are routed over one or more sheaves. The one or more sheaves include an outer surface rotatable about a central axis and a flange located at at least one lateral end of the sheave. The sheave further includes a tracking compensator to limit lateral motion of the belt along the outer surface to prevent the belt from contacting the flange.

In this or other embodiments, the tracking compensator comprises an asymmetrical crown on the outer surface of the sheave.

In this or other embodiments, a first sheave radius at a first lateral end of the sheave is greater than a second sheave radius at a second lateral end of the sheave.

In this or other embodiments, the belt travels at substantially a lateral center of the sheave.

In this or other embodiments, the one or more belts are two or more belts.

In this or other embodiments, the plurality of sheaves are arranged in sheave groups each sheave of a sheave group guiding a separate belt of the two or more belts.

In this or other embodiments, wherein each sheave of a sheave group includes an asymmetrical crown on the outer surface of the sheave such that a first sheave radius at a first lateral end of the sheave is greater than a second sheave radius at a second lateral end of the sheave.

In this or other embodiments, wherein a direction of crown of a first sheave of the sheave group is substantially the same as a direction of crown of a second sheave of the sheave group.

In this or other embodiments, a first central axis of a first sheave of the sheave group intersects a second central axis of a second sheave of the sheave group at a sheave angle.

In this or other embodiments, wherein the sheave angle is configured to normalize a stress distribution on the belts.

In this or other embodiments, wherein the first sheave and the second sheave are connected by a steered shaft to have a same rotational speed.

In another embodiment, an elevator system includes an elevator car located in a hoistway and two or more belts operably connected to the elevator car to drive and/or support the elevator car along the hoistway. The system further includes a plurality of sheave groups over which the two or more belts are routed. Each sheave of a sheave group includes an outer surface rotatable about a central axis and a flange located at at least one lateral end of the sheave. The sheave further includes a tracking compensator to limit lateral motion of the belt along the outer surface to prevent the belt from contacting the flange.

In this or other embodiments, the two or more belts twist and draw between a first sheave group and a second sheave group.

In this or other embodiments, a draw angle of a first belt of the two or more belts is equal to a draw angle of a second belt of the two or more belts.

In this or other embodiments, the elevator system has a 4:1 roping arrangement.

The detailed description explains the invention, together with advantages and features, by way of examples with reference to the drawings.

DETAILED DESCRIPTION

Figure 1:
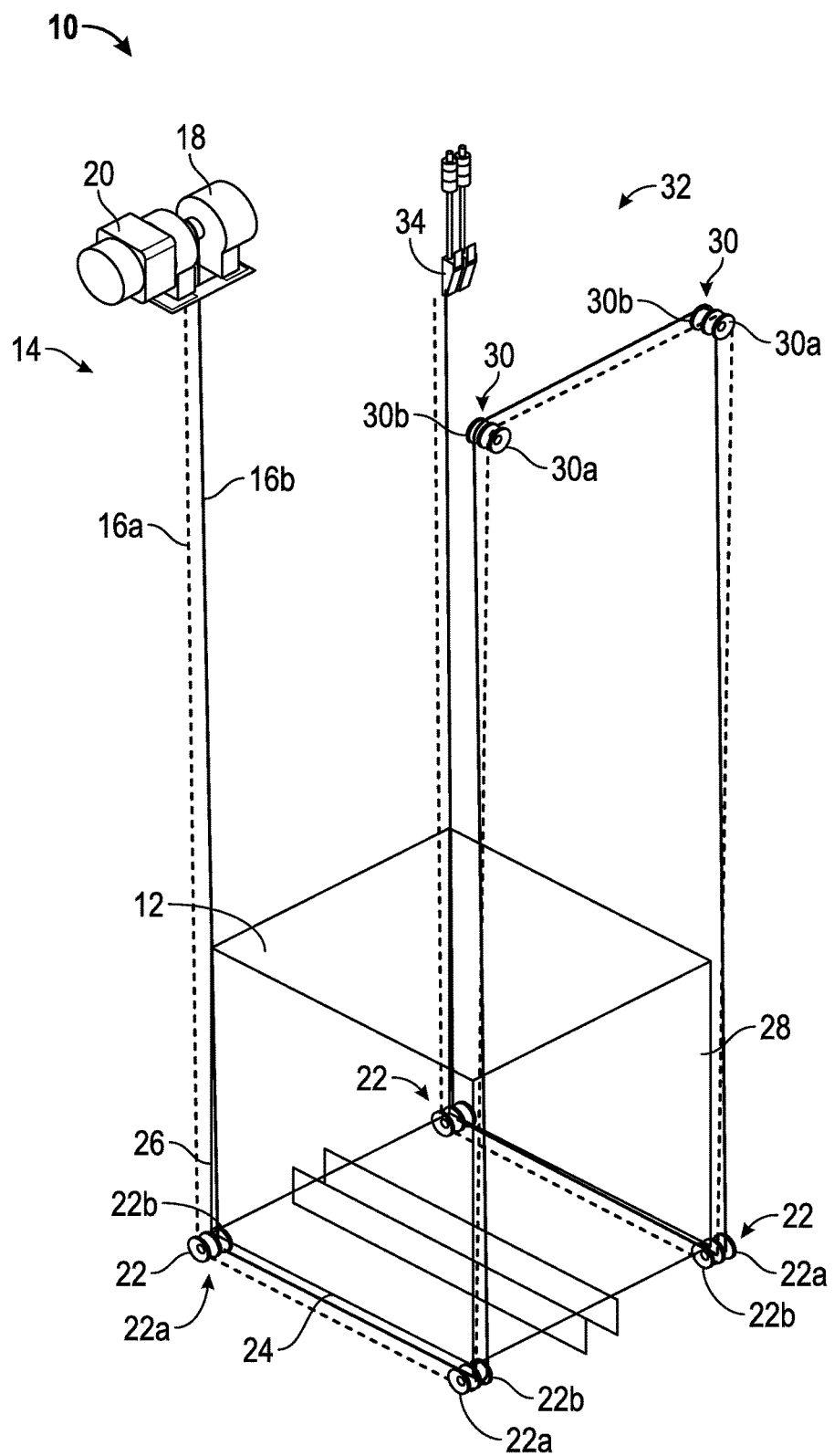
FIG. 1 is a schematic of an embodiment of an elevator system having a 4:1 roping arrangement.

Shown in FIG. 1 is a schematic of an embodiment of a traction elevator system 10. Features of the elevator system 10 that are not required for an understanding of the present invention (such as the guide rails, safeties, etc.) are not discussed herein. The elevator system 10 includes an elevator car 12 operatively suspended or supported in a hoistway 14 with two or more belts 16. The arrangement shown is referred to a 4:1 roping arrangement, though the structure disclosed herein may be utilized in elevator systems 10 having other roping arrangements. In the system of FIG. 1, a first belt 16a and a second belt 16b extend from a traction sheave 18 which is driven by a machine 20. The first belt 16a and the second belt 16b support the elevator car 12 via support sheave pairs 22 secured to the elevator car 12, for example, at a car bottom 24. The support sheave pairs 22 comprise support shaves 22a and 22b, which are coaxial in their rotation. The system of FIG. 1 includes two sheave pairs 22 to transfer the first belt 16a and the second belt 16b under and across the elevator car 12 from a drive side 26 of the hoistway 14 (the side closest to the machine 20) to a non-drive side 28 of the hoistway 14 (the side furthest from the machine 20).

The first belt 16a and second belt 16b are extended from the support sheave pairs 22 up and around a transfer sheave pair 30 comprising a first transfer sheave 30a and a second transfer sheave 30b. The transfer sheave pair 30 is secured at a fixed position in the hoistway 14, for example at or near a top 32 of the hoistway 14. Due to the orientation of the transfer sheave pair 30, it is necessary for the first belt 16a and second belt 16b to twist, in some embodiments about 90 degrees, between the support sheave pair 22 and the transfer sheave pair 30. More detail regarding the twist of belts 16a, 16b, and the configuration of transfer sheaves 30a and 30b will be provided below. The first belt 16a and second belt 16b are routed over a second transfer sheave pair 30 and down the hoistway 14 to another support sheave pair 22 at the car bottom 24, between which the first belt 16a and second belt 16b twist again to match the orientation of the support sheave pair 22. The belts 16a and 16b pass under the elevator car 12 from the non-drive side 28 to the drive side 26 then up the hoistway 14 to a termination point.

Figure 2:
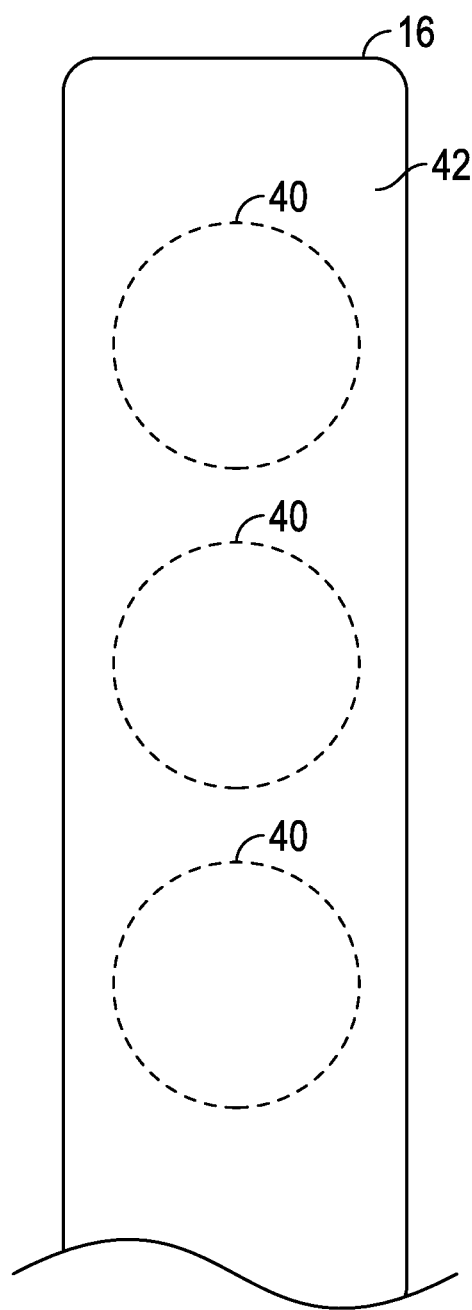
FIG. 2 is a cross-sectional view of an elevator belt.
Figure 3:
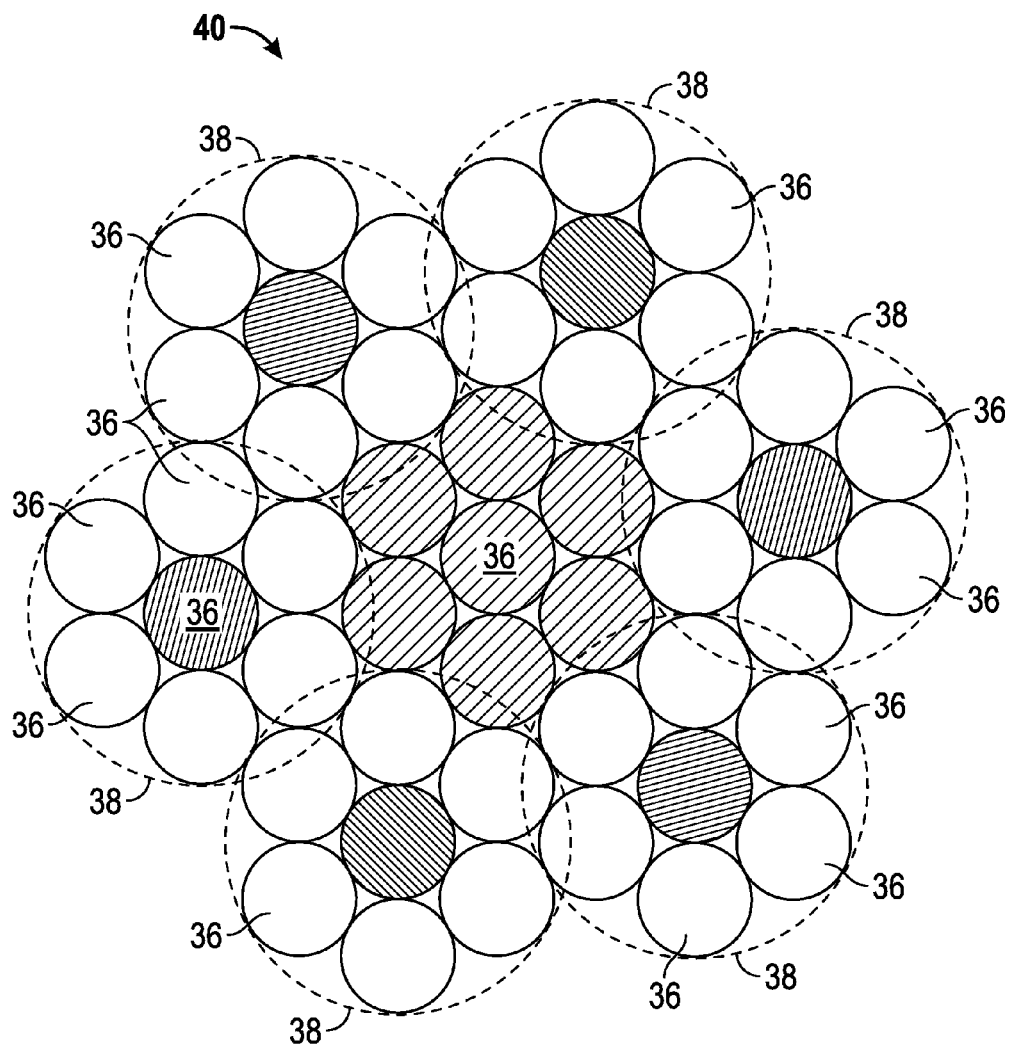
FIG. 3 is a cross-sectional view of a cord or rope.

In some embodiments, as shown in FIG. 2, the belts 16a and 16b are coated steel belts. Each belt 16 is constructed of a plurality of wires 36 (e.g. twisted into one or more strands 38 and/or cords 40 as shown in FIG. 3) in a jacket 42. As seen in FIG. 2, the belt 16 has an aspect ratio greater than one (i.e. belt width is greater than belt thickness). The belts 16 are constructed to have sufficient flexibility when passing over the sheave to provide low bending stresses, meet belt life requirements and have smooth operation, while being sufficiently strong to be capable of meeting strength requirements for suspending and/or driving the elevator car 12. The jacket 42 could be any suitable material, including a single material, multiple materials, two or more layers using the same or dissimilar materials, and/or a film. In one arrangement, the jacket 42 could be a polymer, such as an elastomer, applied to the cords 40 using, for example, an extrusion or a mold wheel process. In another arrangement, the jacket 42 could be a woven fabric that engages and/or integrates the cords 40. As an additional arrangement, the jacket 42 could be one or more of the previously mentioned alternatives in combination.

The jacket 42 can substantially retain the cords 40 therein. The phrase substantially retain means that the jacket 42 has sufficient engagement with the cords 40 to transfer torque from the machine 20 through the jacket 42 to the cords 40 to drive movement of the elevator car 12. The jacket 42 could completely envelop the cords 40 (such as shown in FIG. 2), substantially envelop the cords 40, or at least partially envelop the cords 40.

Figure 4:
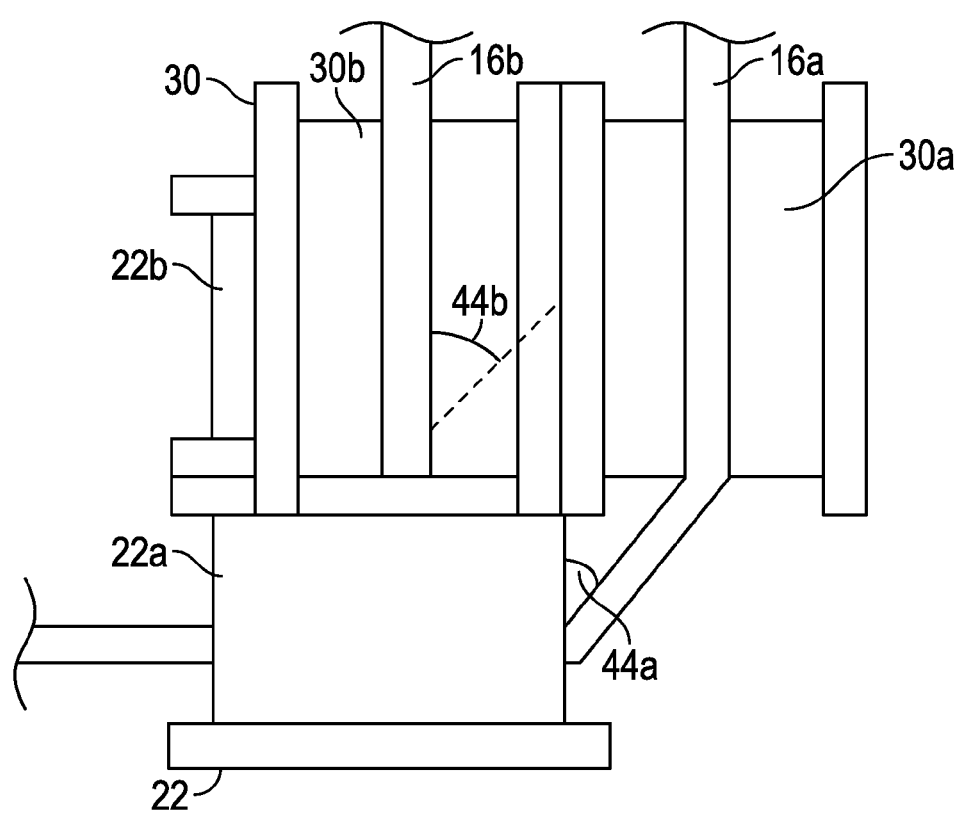
FIG. 4 is a perspective view of an embodiment of a sheave arrangement for an elevator system.

Referring to FIG. 4, a view looking down the hoistway 14 at transfer sheave pair 30 and support sheave pair 22 is shown. In this embodiment, the transfer sheave pair 30 and the support sheave pair 22 are positioned such that a first draw angle 44a of belt 16a between support sheave 22a and transfer sheave 30a is equal and opposite to a second draw angle 44b of belt 16b between support sheave 22b and transfer sheave 30b.

Figure 5:
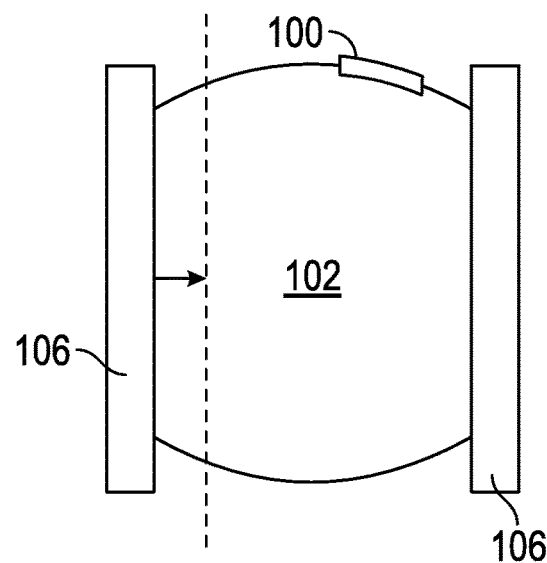
FIG. 5 is an illustration of a prior art sheave.

Referring now to FIG. 5, in a typical prior art system, sheaves 102 are crowned symmetrically between flanges 106 is an effort to guide belts 100 toward a center of the sheave 102. When twist and/or draw is introduced to the system, however, such as in multi-belt systems, the belts 100 tend to reside and travel on one side of the symmetrically crowned sheave 102.

Figure 6:
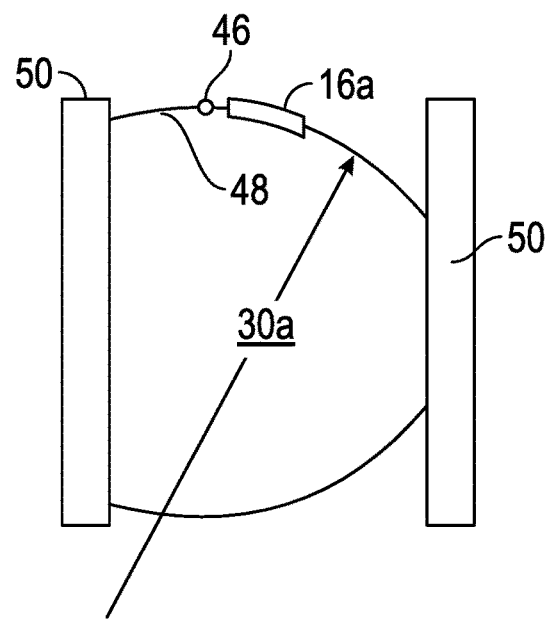
FIG. 6 is an illustration of an embodiment of an asymmetrically crowned sheave for an elevator system.

Referring now to the embodiment of FIG. 6, shown is an embodiment of first transfer sheave 30a and belt 16a. It is to be appreciated, however, that the following disclosure may be applied to any of the sheaves and belts in the elevator system 10 to realize the benefit thereof. Since draw in the system 10 causes the belt 16a to ride to one side of a peak 46 (where the sheave 30a has the largest radius), the sheave 30a includes a tracking compensator, in this embodiment an asymmetrical crown 48, so that peak 46 is not equidistant between flanges 50, but such that a position where belt 16a tends to ride is equidistant between the flanges 50. This increases a minimum distance between the belt 16a and flanges 50 and reduces the likelihood that the belt 16a will rub flange 50, thus preventing excessive wear on the belt 16a. The crown shown in FIG. 6 is a circular crown 48 having a substantially continuous radius, but in other embodiments other crown shapes may be utilized, such as those with multiple radii or polynomial shapes.

Figure 7:
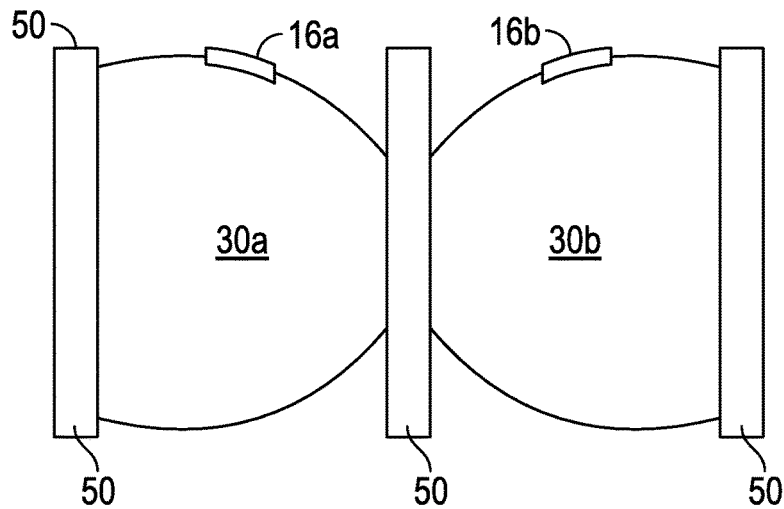
FIG. 7 is an illustration of an embodiment of an asymmetrically crowned sheave pair for an elevator system.
Figure 8:
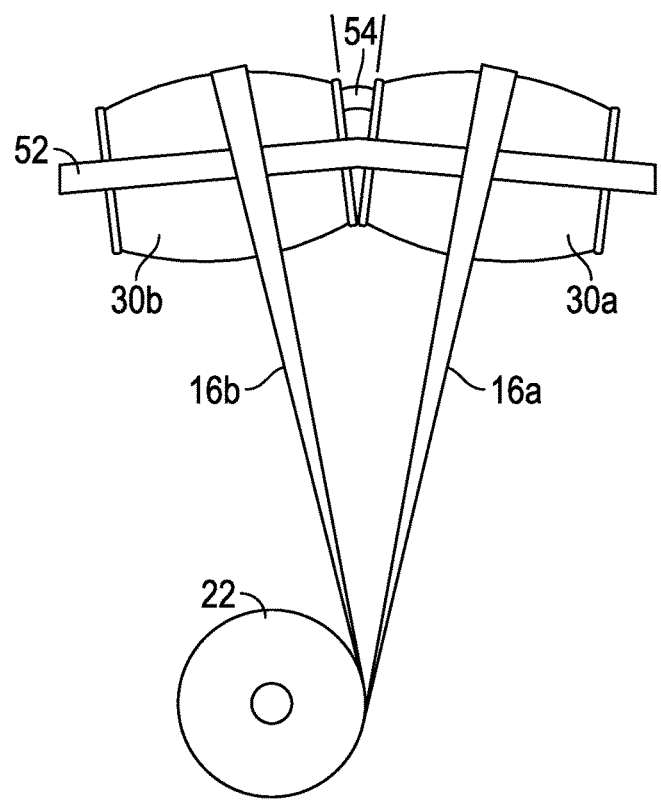
FIG. 8 is an illustration of another embodiment of a sheave pair for an elevator system.
Figure 9:
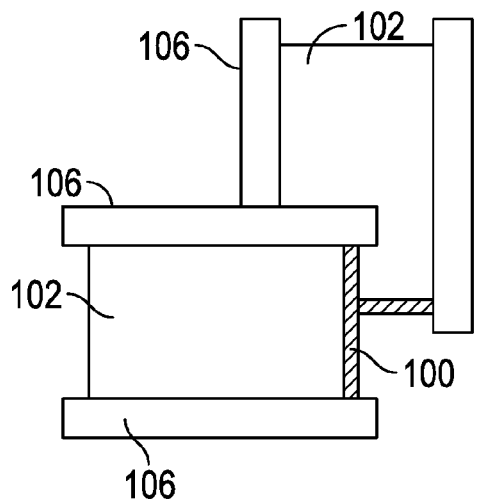
FIG. 9 is an illustration of a prior art sheave arrangement for a single belt elevator system.
Figure 10:
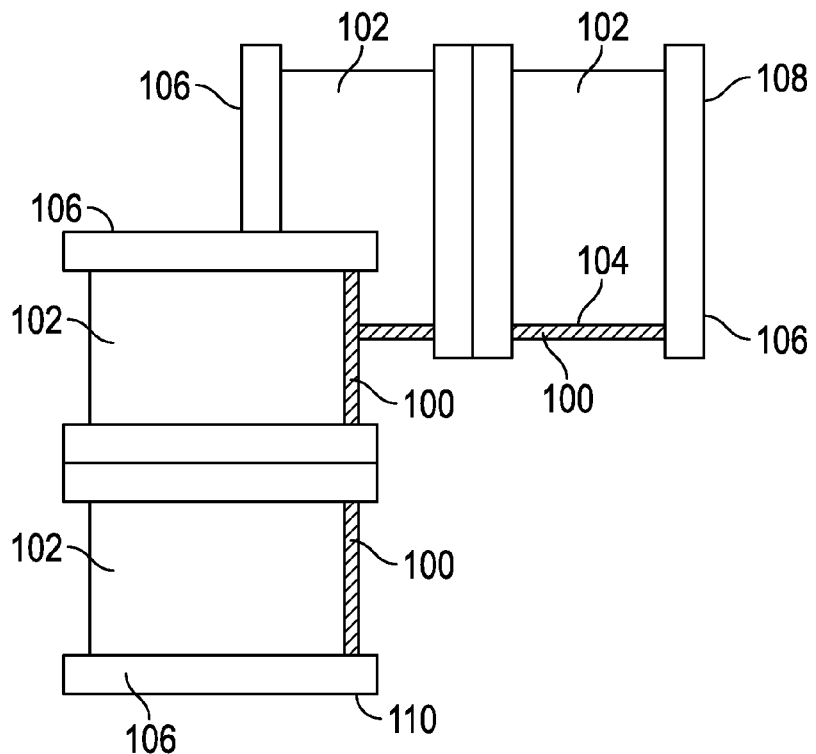
FIG. 10 is an illustration of a prior art sheave arrangement for a two-belt elevator system.

As shown in FIG. 7, pairs of asymmetrically crowned sheaves can be utilized to form transfer sheave pairs 30, and/or support sheave pairs 22. In embodiments such as those of FIG. 4, where transfer sheave pairs 30 and support sheave pairs 30 are arranged such that belts 16a and 16b have equal and opposite draw angles 44a and 44b, the transfer sheaves 30a and 30b may be configured to have equal and opposite crown such that belts 16a and 16b remain substantially centered on transfer sheaves 30a and 30b. Although not shown, one skilled in the art will readily appreciate that support sheaves 22a and 22b may similarly have equal and opposite In another embodiment, shown in FIG. 8, rather than residing on the same linear axis of rotation as in other embodiments, the tracking compensator includes a common jointed or steered shaft 52 about which the first transfer sheave 30a and second transfer sheave 30b rotate. The steered shaft 52 offsets the transfer sheaves 30a and 30b such that a sheave angle 54 exists between the first transfer sheave 30a and the second transfer sheave 30b. In some embodiments, the sheave angle 54 is up to about 10 degrees. The sheave angle 54 normalizes a stress distribution on the belts 16a and 16b over the first transfer sheave 30a and second transfer sheave 30b. Normalizing the stress distribution reduces lateral motion of the belts 16a and 16b at the first transfer sheave 30a and the second transfer sheave 30b and reduces the likelihood of belts 16a and 16b impacting and rubbing on flanges 50. It is to be appreciated that first support sheave 22a and second support sheave 22b may be similarly configured to normalize stress distribution in the belts 16a and 16b.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. An elevator system comprising:
   an elevator car disposed in a hoistway;
   two or more belts operably connected to the elevator car to drive and/or support the elevator car along the hoistway; and
   two or more sheaves over which the two or more belts are routed, each sheave of the two or more sheaves including:
     an outer surface rotatable about a central axis; and
     a flange disposed at at least one lateral end of the sheave;
   the two or more sheaves arranged in sheave groups, each sheave of the sheave group guiding a separate belt of the two or more belts, a first sheave of the sheave group and a second sheave of the sheave group disposed at and configured to rotate about a common shaft, the common shaft configured such that
   a first central axis of the first sheave of the sheave group intersects a second central axis of the second sheave of the sheave group at a non-zero sheave angle.

2. The elevator system of claim 1, wherein the two or more belts twist and draw between a first sheave group and a second sheave group.

3. The elevator system of claim 1, wherein the sheave angle is between 1 degree and 10 degrees.

4. The elevator system of claim 1, further comprising an asymmetrical crown on the outer surface of at least one sheave of the two or more sheaves.

5. The elevator system of claim 1, wherein the belt travels at substantially a lateral center of the sheave.

6. An elevator system comprising:
   an elevator car disposed in a hoistway;
   two or more belts operably connected to the elevator car to drive and/or support the elevator car along the hoistway; and
   a plurality of sheave groups over which the two or more belts are routed, each sheave of a sheave group including:
     an outer surface rotatable about a central axis; and
     a flange disposed at at least one lateral end of the sheave;
   wherein a first sheave of the sheave group and a second sheave of the sheave group are disposed at and configured to rotate about a common shaft, the common shaft configured such that a first central axis of a first sheave of the sheave group intersects a second central axis of a second sheave of the sheave group at a non-zero sheave angle.

7. The elevator system of claim 6, wherein the two or more belts twist and draw between a first sheave group and a second sheave group.

8. The elevator system of claim 6, wherein the sheave angle is between 1 degree and 10 degrees.

9. The elevator system of claim 6, wherein the elevator system has a 4:1 roping arrangement.

10. The elevator system of claim 6, further comprising an asymmetrical crown on the outer surface of at least one sheave such that a first sheave radius at a first lateral end of the sheave is greater than a second sheave radius at a second lateral end of the sheave.

* * * * *